US012561313B2

(12) United States Patent
Blum et al.

(10) Patent No.: US 12,561,313 B2
(45) Date of Patent: *Feb. 24, 2026

(54) QUERY VALIDATION AND PROCESSING IN DATA CLEAN ROOMS

(71) Applicant: Snowflake Inc., Bozeman, MT (US)

(72) Inventors: Rachel Frances Blum, South Orange, NJ (US); Justin Langseth, Kailua, HI (US); Michael Earle Rainey, Kennewick, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,760

(22) Filed: Apr. 23, 2024

(65) Prior Publication Data

US 2024/0346017 A1 Oct. 17, 2024

Related U.S. Application Data

(63) Continuation of application No. 18/162,710, filed on Jan. 31, 2023, now Pat. No. 11,989,173, which is a continuation of application No. 17/816,420, filed on Jul. 31, 2022, now Pat. No. 12,067,005.

(60) Provisional application No. 63/366,286, filed on Jun. 13, 2022.

(51) Int. Cl.
| | |
|---|---|
| *G06F 16/30* | (2019.01) |
| *G06F 16/242* | (2019.01) |
| *G06F 16/2455* | (2019.01) |
| *G06F 16/27* | (2019.01) |

(52) U.S. Cl.
CPC ........ *G06F 16/242* (2019.01); *G06F 16/2456* (2019.01); *G06F 16/27* (2019.01)

(58) Field of Classification Search
CPC ..... G06F 16/242; G06F 16/27; G06F 16/2456
See application file for complete search history.

(56) References Cited

U.S. PATENT DOCUMENTS

| | | | |
|---|---|---|---|
| 7,421,442 | B2 | 9/2008 | Gelb et al. |
| 8,655,719 | B1 | 2/2014 | Li et al. |
| 9,825,963 | B2 | 11/2017 | Kurian et al. |
| 10,628,415 | B1 | 4/2020 | Rajaperumal et al. |
| 10,970,419 | B1 | 4/2021 | Blum et al. |
| 10,999,355 | B1 | 5/2021 | Chu et al. |
| 11,216,580 | B1 | 1/2022 | Holboke et al. |
| 11,347,886 | B1 | 5/2022 | Langseth et al. |
| 11,989,173 | B2 | 5/2024 | Blum et al. |
| 12,067,005 | B2 | 8/2024 | Blum et al. |
| 2005/0216451 | A1 | 9/2005 | Enzler et al. |

(Continued)

OTHER PUBLICATIONS

"U.S. Appl. No. 17/538,785, Non Final Office Action mailed Mar. 31, 2022", 12 pgs.

(Continued)

*Primary Examiner* — Khanh B Pham
(74) *Attorney, Agent, or Firm* — Schwegman Lundberg & Woessner, P.A.

(57) ABSTRACT

Embodiments of the present disclosure may provide a data sharing system implemented as a local application of a distributed database. A query from a query template can be validated and executed against shared dataset that comprises portions of data from the database dataset and additional portions of data from another database of the distributed database.

20 Claims, 12 Drawing Sheets

(56) References Cited

U.S. PATENT DOCUMENTS

| | | | |
|---|---|---|---|
| 2008/0208649 | A1 | 8/2008 | Ficery et al. |
| 2010/0274785 | A1 | 10/2010 | Procopiuc et al. |
| 2015/0012838 | A1 | 1/2015 | Hegstad et al. |
| 2016/0070708 | A1 | 3/2016 | Labbi et al. |
| 2017/0161514 | A1 | 6/2017 | Dettinger et al. |
| 2017/0169253 | A1 | 6/2017 | Curcio et al. |
| 2018/0218168 | A1 | 8/2018 | Goel et al. |
| 2018/0357444 | A1 | 12/2018 | Kammath et al. |
| 2019/0213185 | A1* | 7/2019 | Arroyo .............. G06F 16/2428 |
| 2019/0362083 | A1 | 11/2019 | Ortiz et al. |
| 2020/0311297 | A1 | 10/2020 | Langseth et al. |
| 2021/0084105 | A1 | 3/2021 | Shadmon et al. |
| 2021/0357395 | A1 | 11/2021 | Mccray et al. |
| 2023/0401200 | A1 | 12/2023 | Blum et al. |
| 2023/0401201 | A1 | 12/2023 | Blum et al. |

OTHER PUBLICATIONS

"U.S. Appl. No. 17/652,873, Non Final Office Action mailed Jun. 9, 2022", 10 pgs.

"U.S. Appl. No. 17/816,420, Non Final Office Action mailed Sep. 27, 2022", 11 pgs.

"U.S. Appl. No. 17/816,420, Response filed Dec. 27, 2022 to Non Final Office Action mailed Sep. 27, 2022", 10 pgs.

"U.S. Appl. No. 17/816,420, Final Office Action mailed Jan. 12, 2023", 11 pgs.

"U.S. Appl. No. 18/162,710, Preliminary Amendment filed Feb. 3, 2023", 11 pgs.

"U.S. Appl. No. 18/162,710, Non Final Office Action mailed Apr. 5, 2023", 13 pgs.

"U.S. Appl. No. 17/816,420, Response filed Apr. 12, 2023 to Final Office Action mailed Jan. 12, 2023", 10 pgs.

"U.S. Appl. No. 18/162,710, Examiner Interview Summary mailed Jun. 28, 2023", 2 pgs.

"U.S. Appl. No. 18/162,710, Response filed Jun. 28, 2023 to Non Final Office Action mailed Apr. 5, 2023", 11 pgs.

"U.S. Appl. No. 18/162,710, Final Office Action mailed Jul. 24, 2023", 16 pgs.

"U.S. Appl. No. 17/816,420, Non Final Office Action mailed Sep. 1, 2023", 12 pgs.

"U.S. Appl. No. 18/162,710, Examiner Interview Summary mailed Oct. 19, 2023", 2 pgs.

"U.S. Appl. No. 18/162,710, Response filed Oct. 23, 2023 to Final Office Action mailed Jul. 24, 2023", 13 pgs.

"U.S. Appl. No. 17/816,420, Response filed Nov. 29, 2023 to Non Final Office Action mailed Sep. 1, 2023", 10 pgs.

"U.S. Appl. No. 17/816,420, Examiner Interview Summary mailed Dec. 1, 2023", 2 pgs.

"U.S. Appl. No. 17/816,420, Final Office Action mailed Dec. 15, 2023", 13 pgs.

"U.S. Appl. No. 17/816,420, Response filed Mar. 4, 2024 to Final Office Action mailed Dec. 15, 2023", 12 pgs.

"U.S. Appl. No. 17/816,420, Examiner Interview Summary mailed Mar. 5, 2024", 2 pgs.

"U.S. Appl. No. 18/162,710, Notice of Allowance mailed Mar. 13, 2024", 9 pgs.

"U.S. Appl. No. 17/816,420, Notice of Allowance mailed May 30, 2024", 9 pgs.

U.S. Appl. No. 17/816,420 U.S. Pat. No. 12,067,005, filed Jul. 31, 2022, Data Clean Room Using Defined Access via Native Applications.

U.S. Appl. No. 18/162,710 U.S. Pat. No. 11,989,173, filed Jan. 31, 2023, Query Validation and Processing in Data Clean Rooms.

U.S. Appl. No. 18/765,585, filed Jul. 8, 2024, Data Clean Room Using Defined Access via Native Applications.

"U.S. Appl. No. 18/765,585, Non Final Office Action mailed Apr. 25, 2025", 7 pages.

* cited by examiner

550

PARTY_2 SOURCE DTA

| CUST_ID | EMAIL |
|---------|-------|
| 100 | GEF@456.NET |
| 200 | ABC@123.NET |

500

PARTY_1 SOURCE DATA

| CUST_ID | EMAIL |
|---------|-------|
| 1 | XYZ@123.NET |
| 2 | ABC@123.NET |

800

GENERATE CLEAN ROOM USING
NATIVE APPLICATION
805

GENERATE QUERY
810

VALIDATE QUERY
815

PROVIDE PORTION
OF PROTECTED DATA
820

EXECUTE QUERY
825

STORE DATA
830

900

QUERY VALIDATION AND PROCESSING IN DATA CLEAN ROOMS

PRIORITY APPLICATIONS

This application is a continuation of U.S. patent application Ser. No. 18/162,710, filed Jan. 31, 2023, which is a continuation of U.S. patent application Ser. No. 17/816,420, filed Jul. 31, 2022, which claims priority to U.S. Provisional Application Ser. No. 63/366,286, filed Jun. 13, 2022, the disclosures of which are incorporated herein in their entireties by reference.

TECHNICAL FIELD

The present disclosure generally relates to efficiently managing access to shared data in a database.

BACKGROUND

Databases are used for data storage and access in computing applications. A goal of database storage is to provide enormous sums of information in an organized manner so that it can be accessed, managed, and updated. In a database, data may be organized into rows, columns, and tables. A database platform can have different databases managed by different users. The users may seek to share their database data with one another; however, it is difficult to share the database data in a secure and scalable manner.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Traditionally, most digital advertising involved using third-party cookies. Cookies are small pieces of data generated and sent from a web server and stored on a user's computer by a web browser that is used to gather data about customers' habits based on their website browsing history. Because of privacy concerns, the use of cookies is being restricted. Companies may want to create target groups for advertising or marketing efforts for specific audience segments. To do so, companies may want to compare their customer information with that of other companies to see if their customer lists overlap for the creation of such target groups. Thus, companies may want to perform data analysis, such as an overlap analysis, of their customers or other data. However, it can be difficult to share data securely and efficiently between different database datasets. To address the foregoing, a clean room system implements one or more query templates to create efficient defined access patterns to a data clean room in which data from different database users can be shared and queried. The data clean room system can implement templates for execution in a native application version of the clean room which is installed as a stored procedure instance in a requesting user database account, in accordance with some example embodiments. The data clean room system can further implement privacy mechanisms such as differential privacy to obfuscate the shared data and lesson the attack surface available to malicious users. For example, the data clean room system can implement differential privacy to inject noise in the query results to protect the privacy, where the differential privacy is budgeted via epsilon such that a large epsilon spent causes has less to be noise added, whereas lower epsilon spend add more noise to the query request thereby making it impractical to obtain the underlying sensitive data being shared in the data clean room.

Figure 1:
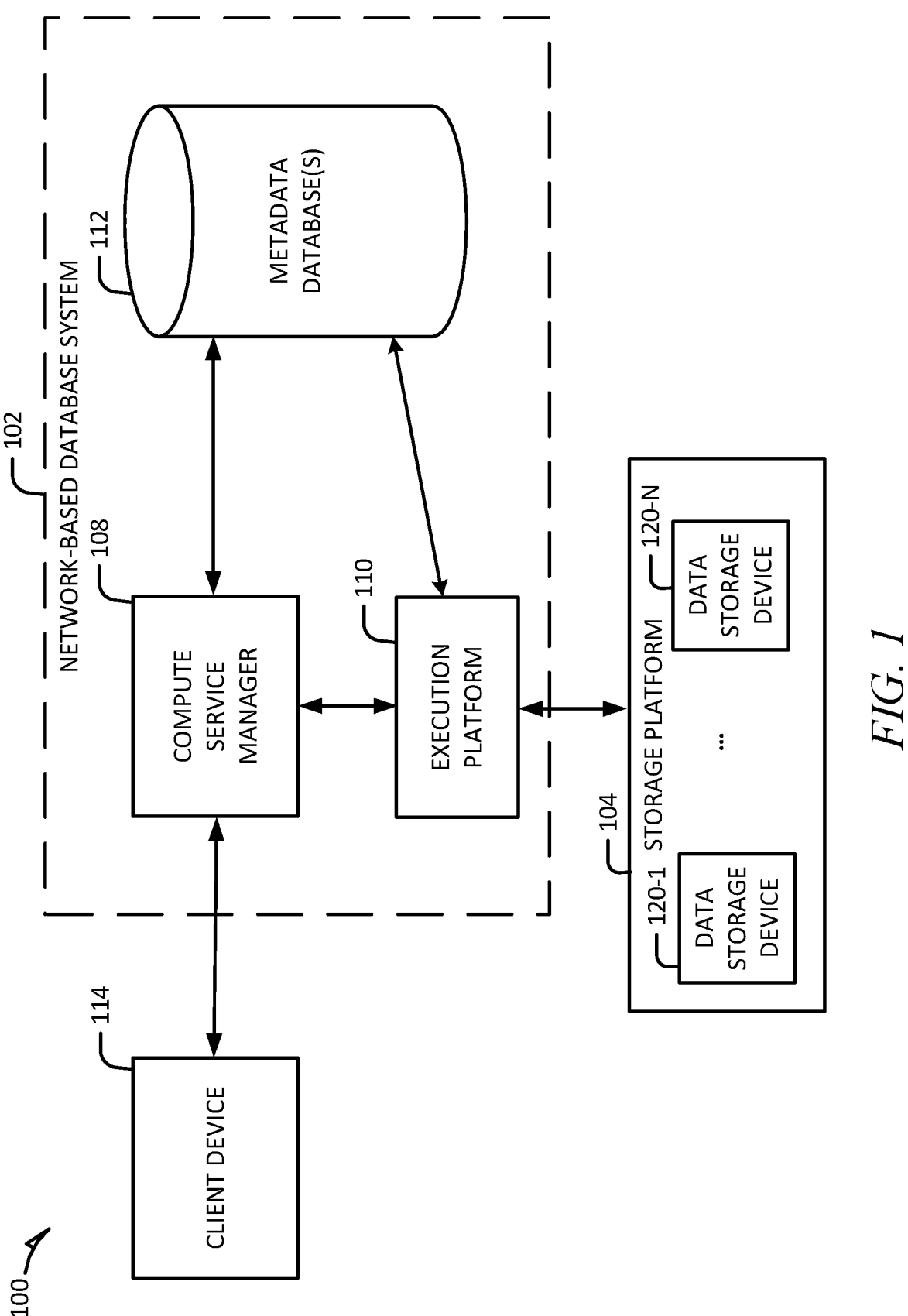
FIG. 1 illustrates an example computing environment in which a network-based database system can data clean rooms, according to some example embodiments.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses.") The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, metadata database(s) 112 may include a summary of data stored in remote data storage systems as well as data available from a local cache. Additionally, metadata database(s) 112 may include information regarding how data is partitioned and organized in remote data storage systems (e.g., the cloud storage platform 104) and local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query, and scanning only the pertinent micro-partitions to respond to the query. Metadata may be automatically gathered on all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata databases 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled with one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112, execution platforms 110, and cloud storage platforms 104 may be implemented as a distributed system (e.g., distributed across multiple systems/platforms at multiple geographic locations). Additionally, each of the compute service managers 108, metadata databases 112, execution platforms 110, and cloud storage platforms 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
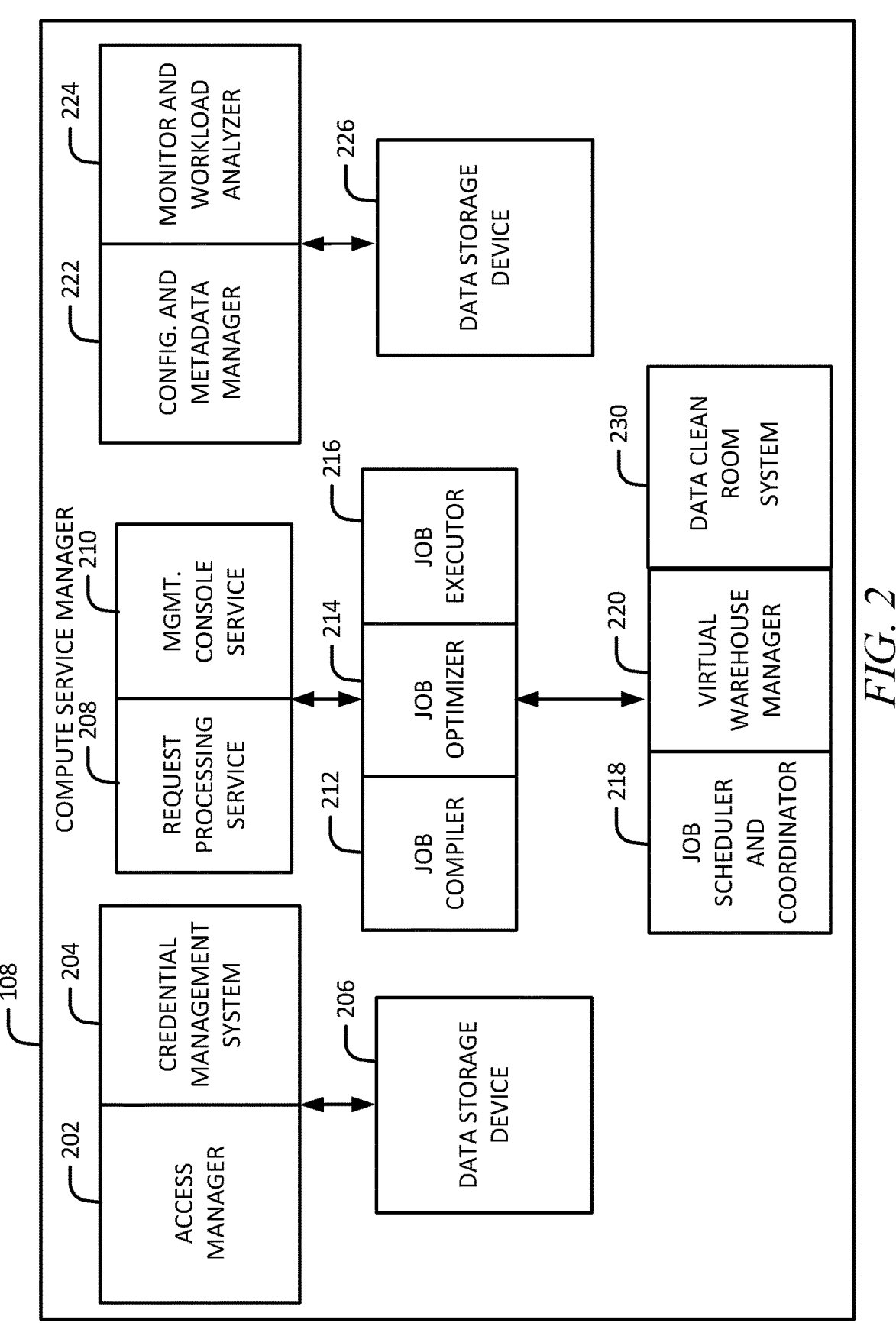
FIG. 2 is a block diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to access metadata database 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and then processed in that prioritized order. In an embodiment, the job scheduler and coordinator 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The data clean room system 230 is configured to perform online error checking and offline error checking, as discussed in further detail below.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), and should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

Figure 3:
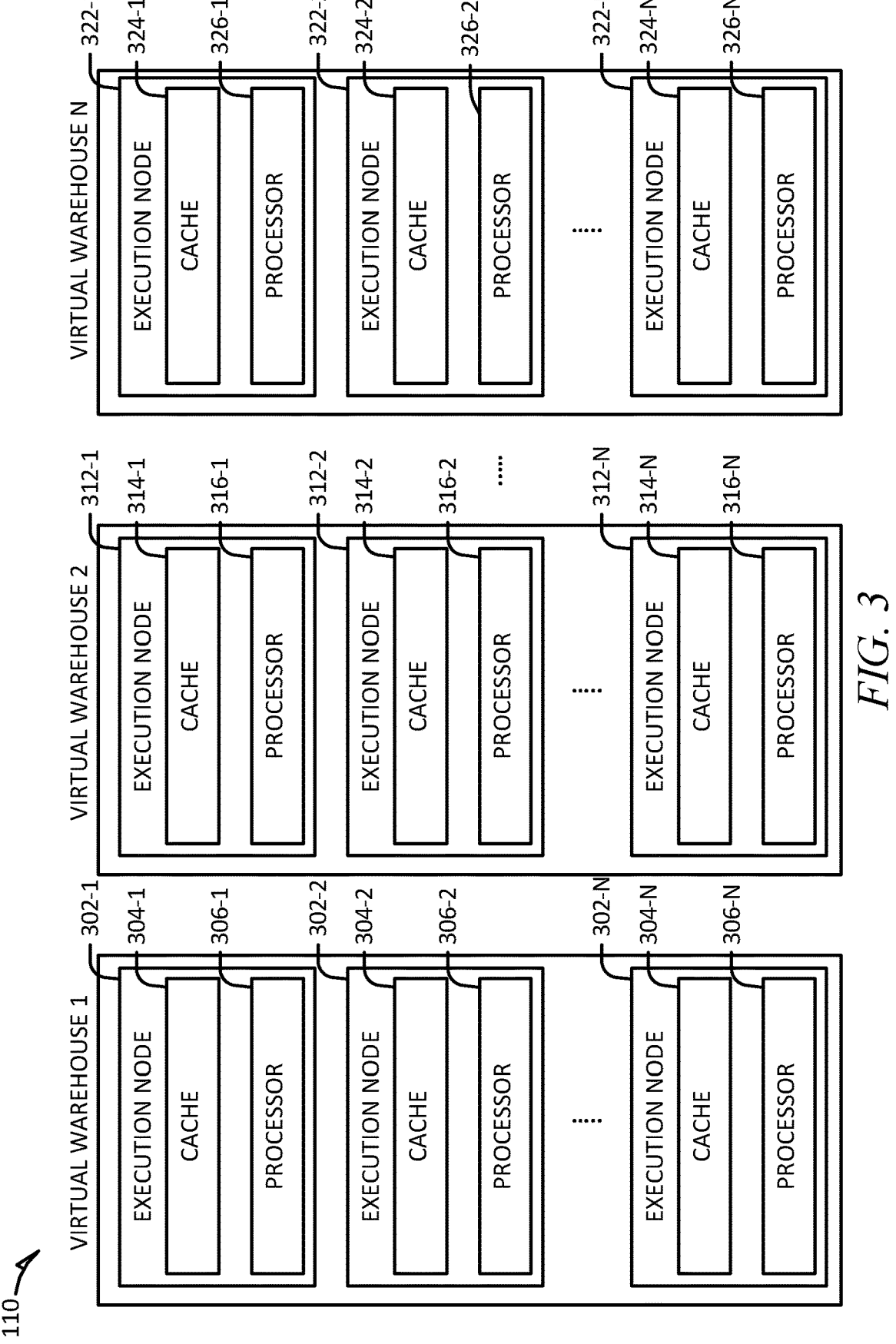
FIG. 3 is a block diagram illustrating components of an execution platform, according to some example embodiments.

FIG. 3 is a block diagram illustrating components of the execution platform 110 of FIG. 1, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in the cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
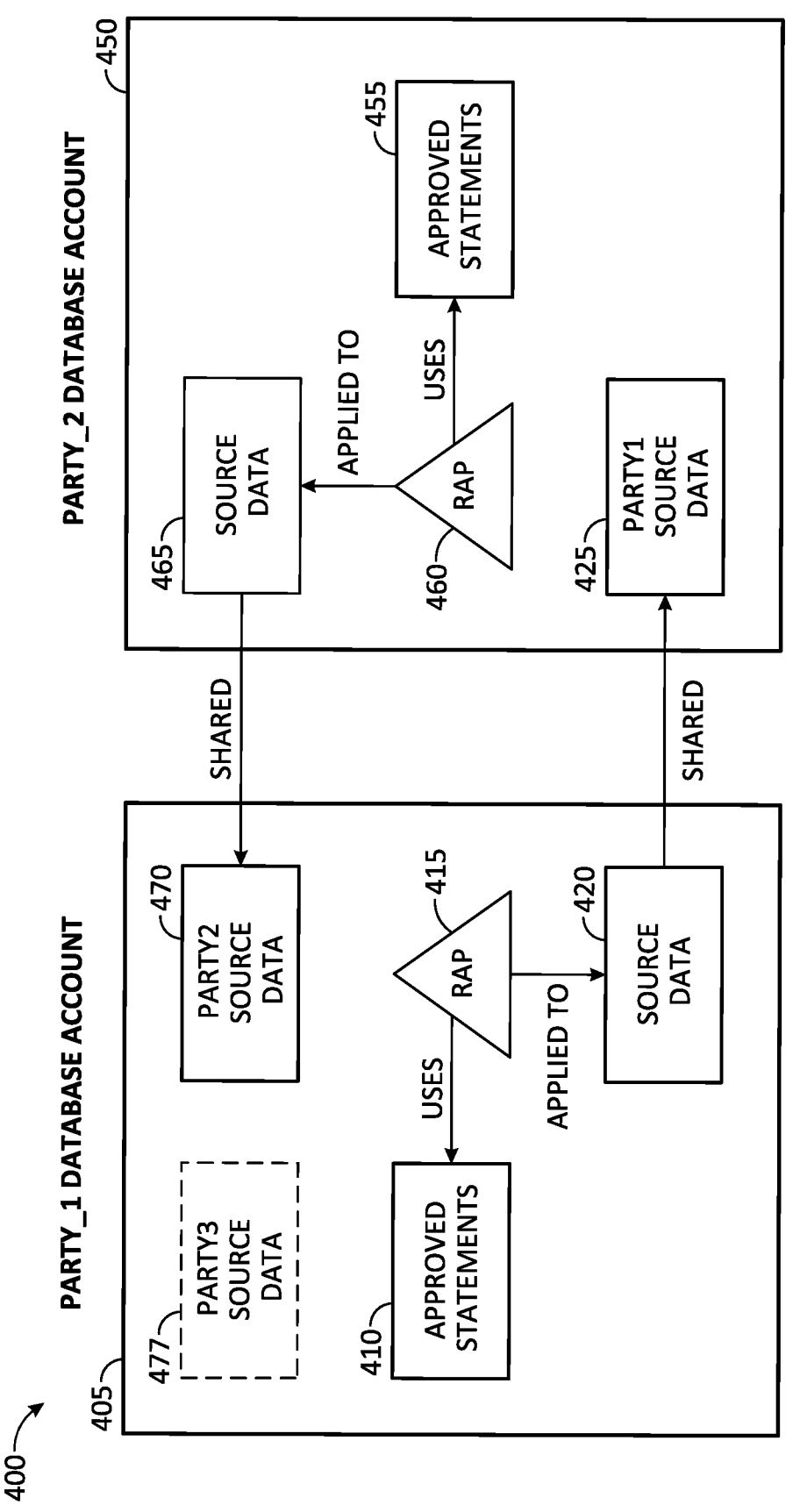
FIG. 4 shows an example of database restrictions on access to database data, according to some example embodiments.

FIG. 4 shows a dynamically restricted data clean room architecture 400, according to some example embodiments. In FIG. 4, a first database account 405 and a second database account 450 share data in a data clean room architecture 400 against which queries can be issued by either account. In the following example, the first database account 405 provides data to the second database account 450 (e.g., using approved statements table 410, row access policy engine 415, source data 420, and shared source data 425), and it is appreciated that the second database account 450 can similarly share data with the first database account 405 (e.g., using approved statements table 455, row access policy engine 460, source data 465, and shared source data 470).

In some example embodiments, a dynamic restriction engine implements a row access policy scheme (e.g., row access policy engine 415, row access policy engine 460) on the source datasets of the first and second database accounts (e.g., source data 420, source data 465). In some example embodiments, the row access policy engine is implemented as a database object of the network-based database system 102 that restricts source data of a database account for use sharing in the clean room. In some example embodiments, a database object in the network-based database system 102 is a data structure used to store and/or reference data. In some example embodiments, the network-based database system 102 implements one or more of the following objects: a database table, a view, an index, a stored procedure of the database system, a user-defined function of the database system, or a sequence. In some example embodiments, when the network-based database system 102 creates a database object type, the object is locked, and a new object type cannot be created due to the network-based database system 102 restricting the object types using the source code of the database system. In some example embodiments, when objects are created, a database object instance is what is created by the database system 102 as an instance of a database object type (e.g., such as a new table, an index on that table, a view on the same table, or a new stored procedure object). The row access policy engine provides row-level security to data of the network-based database system 102 through the use of row access policies to determine which rows to return in the query result. Examples of a row access policy include: allowing one particular role to view rows of a table (e.g., user role of an end-user issuing the query), or including a mapping table in the policy definition to determine access to rows in a given query result. In some example embodiments, a row access policy is a schema-level object of the network-based database system 102 that determines whether a given row in a table or view can be viewed from different types of database statements including SELECT statements or rows selected by UPDATE, DELETE, and MERGE statements.

In some example embodiments, the row access policies include conditions and functions to transform data at query runtime when those conditions are met. The policy data is implemented to limit sensitive data exposure. The policy data can further limit an object's owner (e.g., the role with the OWNERSHIP privilege on the object, such as a table or view) who normally has full access to the underlying data. In some example embodiments, a single row access policy engine is set on different tables and views to be implemented at the same time. In some example embodiments, a row access policy can be added to a table or view either when the object is created or after the object is created.

In some example embodiments, a row access policy comprises an expression that can specify database objects (e.g., table or view), and uses Conditional Expression Functions and Context Functions to determine which rows should be visible in a given context. The following is an example of a Row Access Policy being implemented at query runtime: (A) for data specified in a query, the network-based database system 102 determines whether a row access policy is set on a database object. If a policy is added to the database object, all rows are protected by the policy. (B) The distributed database system then creates a dynamic secure view (e.g., a secure database view) of the database object. (C) The policy expression is evaluated. For example, the policy expression can specify a "current statement" expression that only proceeds if the "current statement" is in the approved statements table, or if the current role of the user that issued the query is a previously specified and allowed role. (D) Based on the evaluation of the policy, the restriction engine generates the query output, such as source data to be shared from a first database account to a second database account, where the query output only contains rows based on the policy definition evaluating to TRUE.

Figure 5:
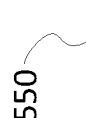
FIG. 5 shows example table data, according to some example embodiments.
Figure 5:
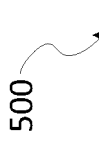

Continuing with reference to FIG. 4, the contents of the approved statements table are agreed upon or otherwise generated by the first database account 405 and the second database account 450. For example, the users managing the first database account 405 and second database account 450 agree upon a query language that is acceptable to both and include the query language in the approved statements table, and the agreed-upon language is stored in the approved statements table 410 on the first database account 405 and also stored in the approved statements table 455 in the second database account 450. As an illustrative example, the source data 420 of the first database account 405 can include a first email dataset 500 of the first database account's users, and the source data 465 of the second database account 450 can include a second email dataset 550 of the second database accounts users, as illustrated in FIG. 5. The two database accounts may seek to determine how many of their user email addresses in their respective datasets match, where the returned result is a number (e.g., each has end-users, and the two database accounts are interested in how many users they share but do not want to share the actual users' data). To this end, the two database accounts store "SELECT COUNT . . . " in the approve query requests table. In this way, a counting query that selects and joins the source data can proceed, but a "SELECT * . . . " query that requests and potentially returns all user data cannot proceed as it is not in the approved statements tables of the respective dataset accounts (e.g., the approved statements table 410 and the approved statements table 455).

Further, although only two database accounts are illustrated in FIG. 4, the data clean room system 230 enables two or more database accounts to share data through the clean room architecture. In past approaches, data clean room data is obfuscated and then shared in a data clean room, and the complexity of matching obfuscated data can result in limiting the data clean room data to only two parties at a time. In contrast, in the approach of FIG. 4, a third database account (not illustrated in FIG. 4) can provide a third-party shared dataset 477 using the data clean room system 230, and database statements can be issued that join data from the three datasets, such as a SELECT COUNT . . . on a joined data from the source data 420, the shared source data 470 from the second database account 450, and the third-party shared dataset 477 from the third database account (e.g., as opposed to a requester database account sharing data with a first provider database account, and the requester database account further correlating the data with another second provider database account using sequences of encrypted functions provided by the first and second provider accounts), in accordance with some example embodiments.

Figure 6A:
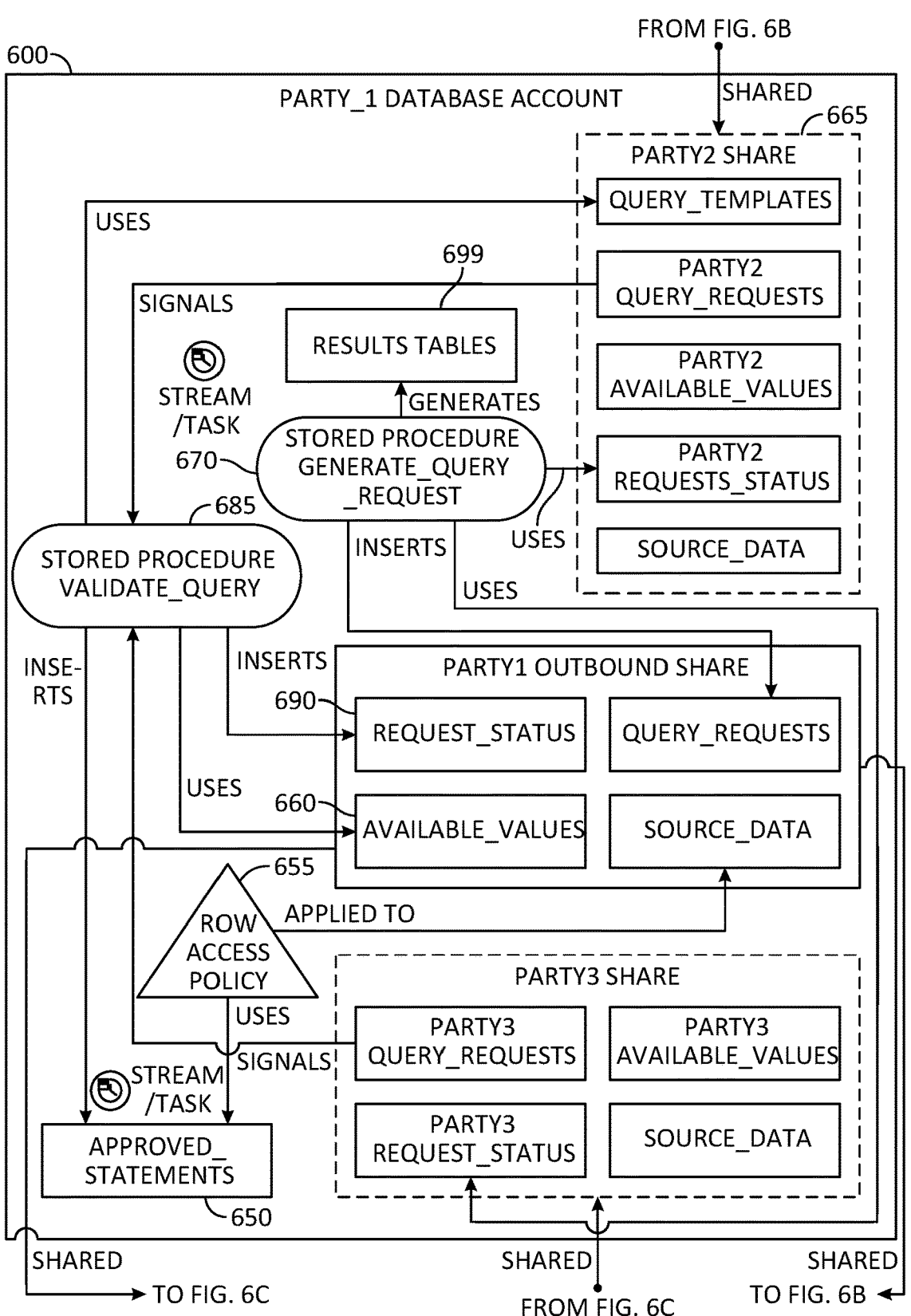
FIGS. 6A-C show example database architectures for implementing query templates for multiple entities sharing data in a data clean environment, according to some example embodiments.
Figure 6B:
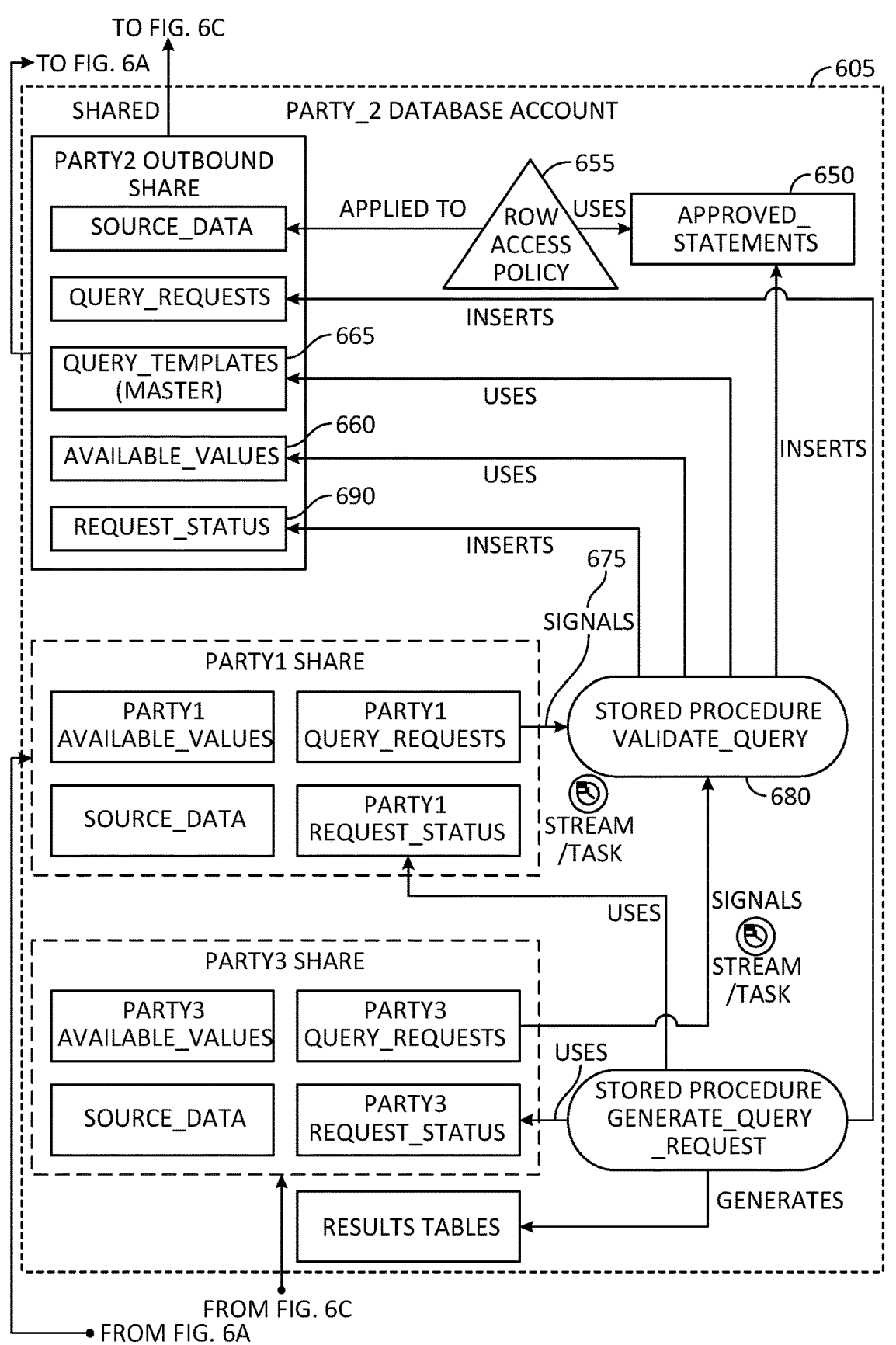
Figure 6C:
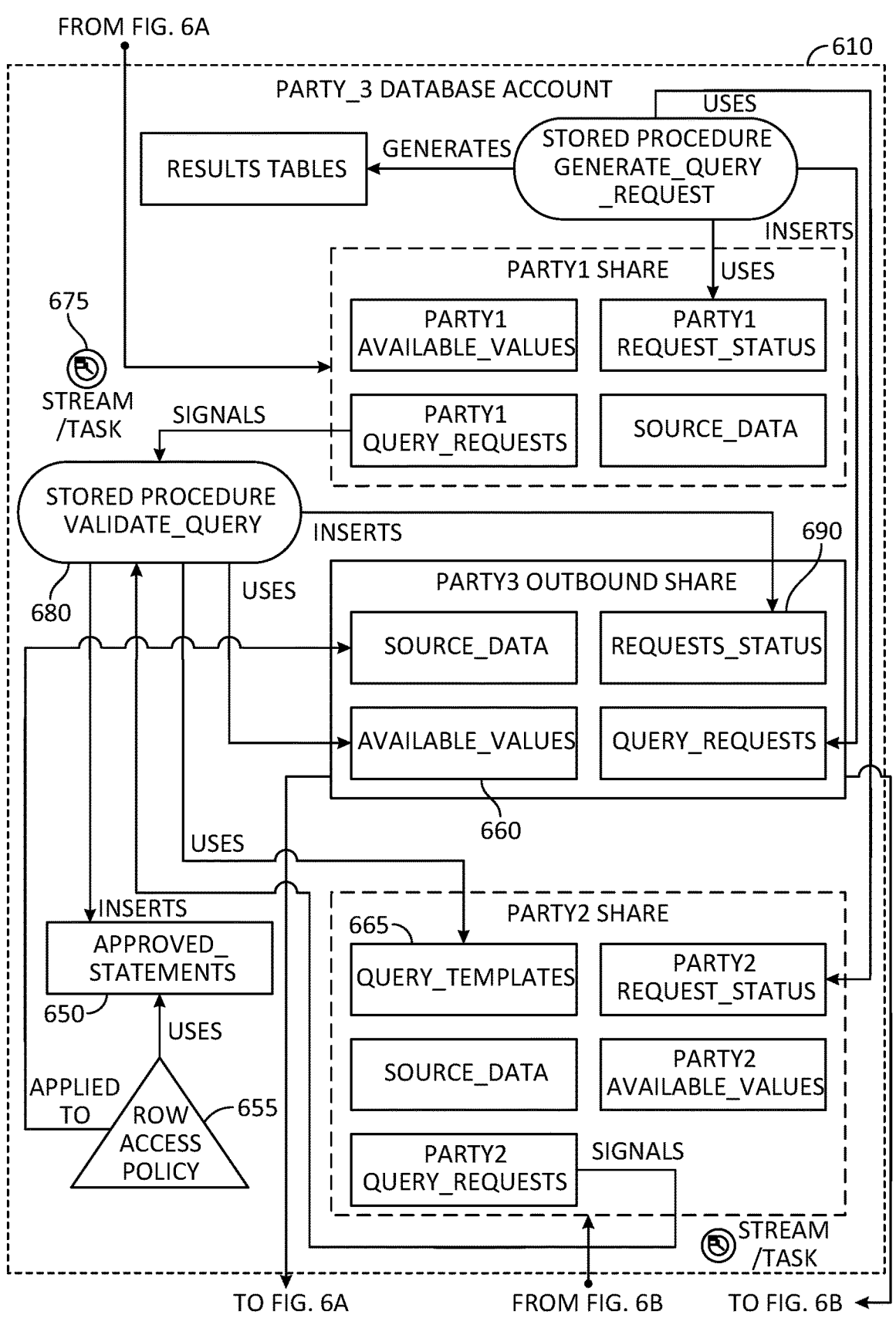

FIG. 6A-C shows an example data clean room architecture for sharing data between multiple parties, according to some example embodiments. In the illustrated example, party_1 database account 600 is in FIG. 6A, party_2 database account 605 is in FIG. 6B, and party_3 database account 610 is in FIG. 6C, where data is transferred (e.g., replicated, shared) between the different accounts, as indicated by the broken labeled arrows that refer to other figures; for example, in FIG. 6B, a "Party2 Outbound Share" is shared from the party_2 database account 605 to the party_1 database account 600 in which the share is labeled as "Party2 Share" and connected by a broken arrow between FIG. 6A and FIG. 6B. The below data flows refer to operations that each party performs to share data with the other parties of FIGS. 6A-6C. For example, at operation 650, the party_1 database account 600 creates its APPROVED _STATEMENTS in its own database instance (e.g., illustrated in FIG. 6A); likewise at operation 650, party_2 database account 605 creates its APPROVED _ STATEMENTS in its own database instance (e.g., illustrated in FIG. 6B), and further, party_3 database account 610 creates its APPROVED _STATEMENTS in its own database instance (e.g., illustrated in FIG. 6C).

At operation 650, each party creates an APPROVED _ STATEMENTS table that will store the query request SQL statements that have been validated and approved. In some example embodiments, one of the parties creates the approved statements table, which is then read by the other parties. In some example embodiments, each of the parties creates their own approved statements table, and a given query on the shared data must satisfy each of the approved statements table or otherwise the query cannot proceed (e.g., "SELECT * . . . " must be in each respective party's approve statements table in order for a query that contains "SELECT * . . . " to operate on data shared between the parties of the cleanroom).

At operation 655, each party creates a row access policy that will be applied to the source table(s) shared to each other party for clean room request processing. The row access policy will check the current_statement( ) function against values stored in the APPROVED_STATEMENTS table.

At operation 660, each party will generate their AVAIL-ABLE_VALUES table, which acts as a data dictionary for other parties to understand which columns and values they can use in query requests. In some example embodiments, the available values comprises schema, allowed columns, metadata specifying prohibited rows or cell values. In some example embodiments, the available values data is not the actual data itself (e.g., source data) but rather specifies what data can be accessed (e.g., which columns of the source data) by the other parties (e.g., consumer accounts) for use in their respective shared data jobs (e.g., overlap analysis).

With reference back to FIG. 6C, at operation 665, each party agrees on one or more query templates that can be used for query requests. For example, if a media publisher and advertiser are working together in a clean room, they may approve an "audience overlap" query template. The query template would store join information and other static logic, while using placeholders for the variables (select fields, filters, etc.).

As an additional example, one of the parties is a Provider Account that specifies which statements are stored in the Available Statements table (e.g., thereby dictating how the provider data will be accessed by any consumer account wanting to access the Provider data. Further, in some example embodiments, the Provider Account further provides one or more query templates for use by any of the parties (e.g., consumer accounts) seeking to access the Provider's data according to the query template. For example, a query template can comprise blanks or place-holders "{_____}" that can be replaced by specific fields via the consumer request (e.g., the specific fields can be columns from the consumer data or columns from the provider data). Any change to the query template (e.g., adding an asterisk "*" to select all records) will be rejected by the data restrictions on the provider's data (e.g., the RAP functions as a firewall for the provider's data). In some example embodiments, the query template created by the provider is configured so that is congruent with the row access policy. The provider generated template is then completed by the consumer and will thus likely pass through the row access policy checks of a policy engine (e.g., data firewall 716) since the provider configured both, and any manual change to the template outside what the provider designed will likely be rejected by the row access policy engine. For instance, if the consumer changes the template to use a "*" in a place not in the original template, then the attempted selected all data will be firewalled by the row access policy engine.

Continuing, at operation 670 (FIG. 6A), one of the party's (e.g., party_1 database account 600, in this example) will generate a clean room query request by calling the GENERATE_QUERY_REQUEST stored procedure. This procedure will insert the new request into the QUERY_REQUESTS table. This table is shared to each other party, along with the source data table(s) that have the row access policy enabled, the party's AVAILABLE_VALUES table, and the REQUEST_STATUS table.

At operation 675, each party has a stream object created against the other party's QUERY_REQUESTS table, capturing any inserts to that table. A task object will run on a set schedule and execute the VALIDATE_QUERY stored procedure if the stream object has data.

At operation 680, the VALIDATE_QUERY procedure is configured to: (1) Ensure the query request select and filter columns are valid attributes by comparing against the AVAILABLE_VALUES table. (2) Ensure the query template accepts the variables submitted. (3) Ensure the threshold or other query restrictions are applied. (4) If validation succeeds, the procedure generates a SQL statement and stores it in the APPROVED_STATEMENTS table; otherwise, the validation fails or is rejected, and the process halts and one or more error messages are issued, in accordance with some example embodiments. (5) Updates the REQUEST_STATUS table with success or failure. If successful, the SQL statement is also added to the record.

At operation 685, the GENERATE_QUERY_REQUEST procedure will also call the VALIDATE_QUERY procedure on the requesting party's account. This is to ensure the query generated by each additional party and the requesting party matches, as an extra layer of validation.

At operation 690, the REQUEST_STATUS table, which is shared by each party, is updated with the status from the VALIDATE_QUERY procedure. The GENERATE_QUERY_REQUEST procedure will wait and poll each REQUEST_STATUS table until the status is returned.

At operation 699, once each party has returned a status, the GENERATE _QUERY _REQUEST procedure will compare all of the SQL statements to ensure they match (if the status is approved). If they all match, the procedure will execute the statement and generate the results table.

Figure 7A:
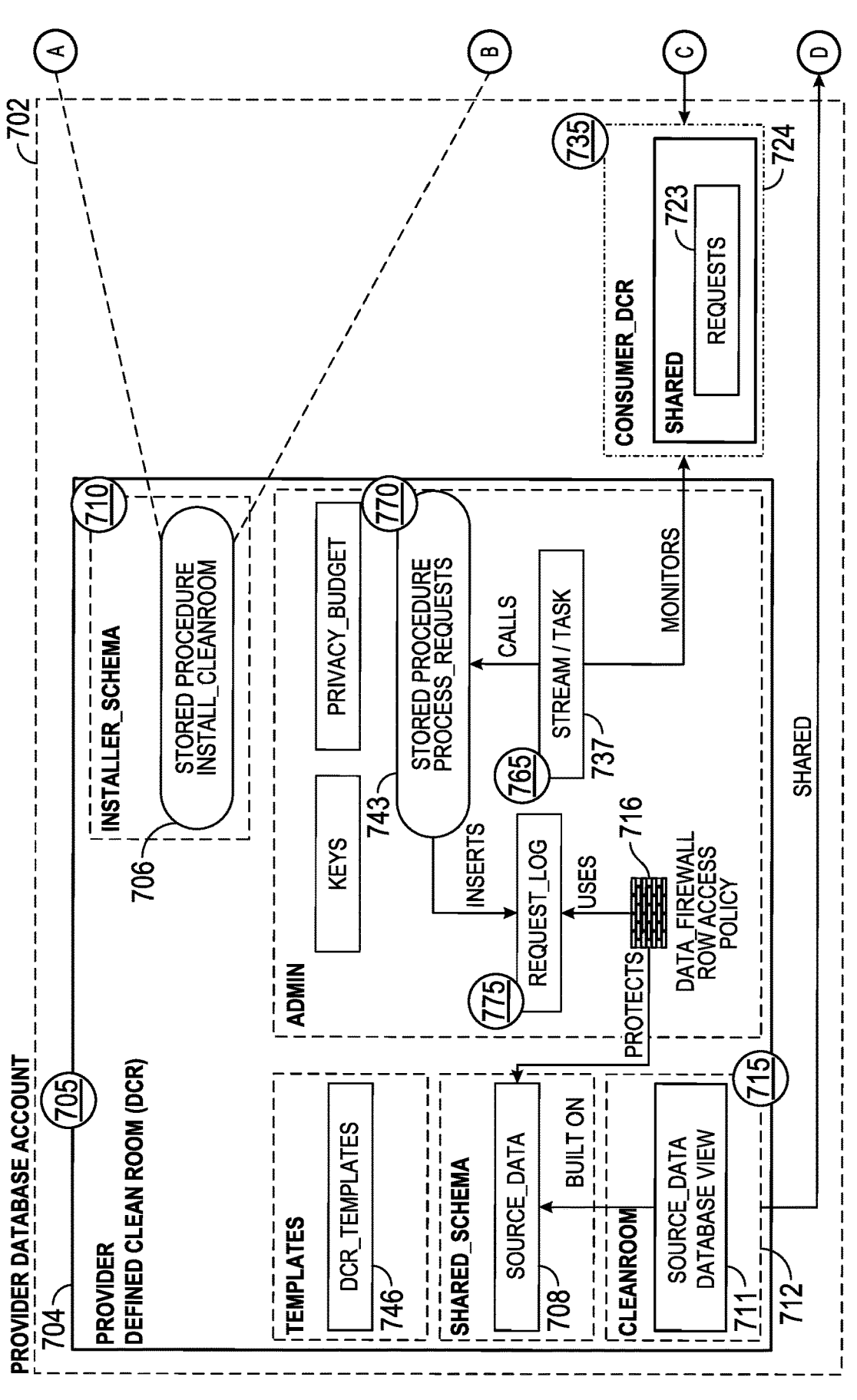
FIGS. 7A and 7B show example database architectures for implementing defined access clean room, according to some example embodiments.
Figure 7B:
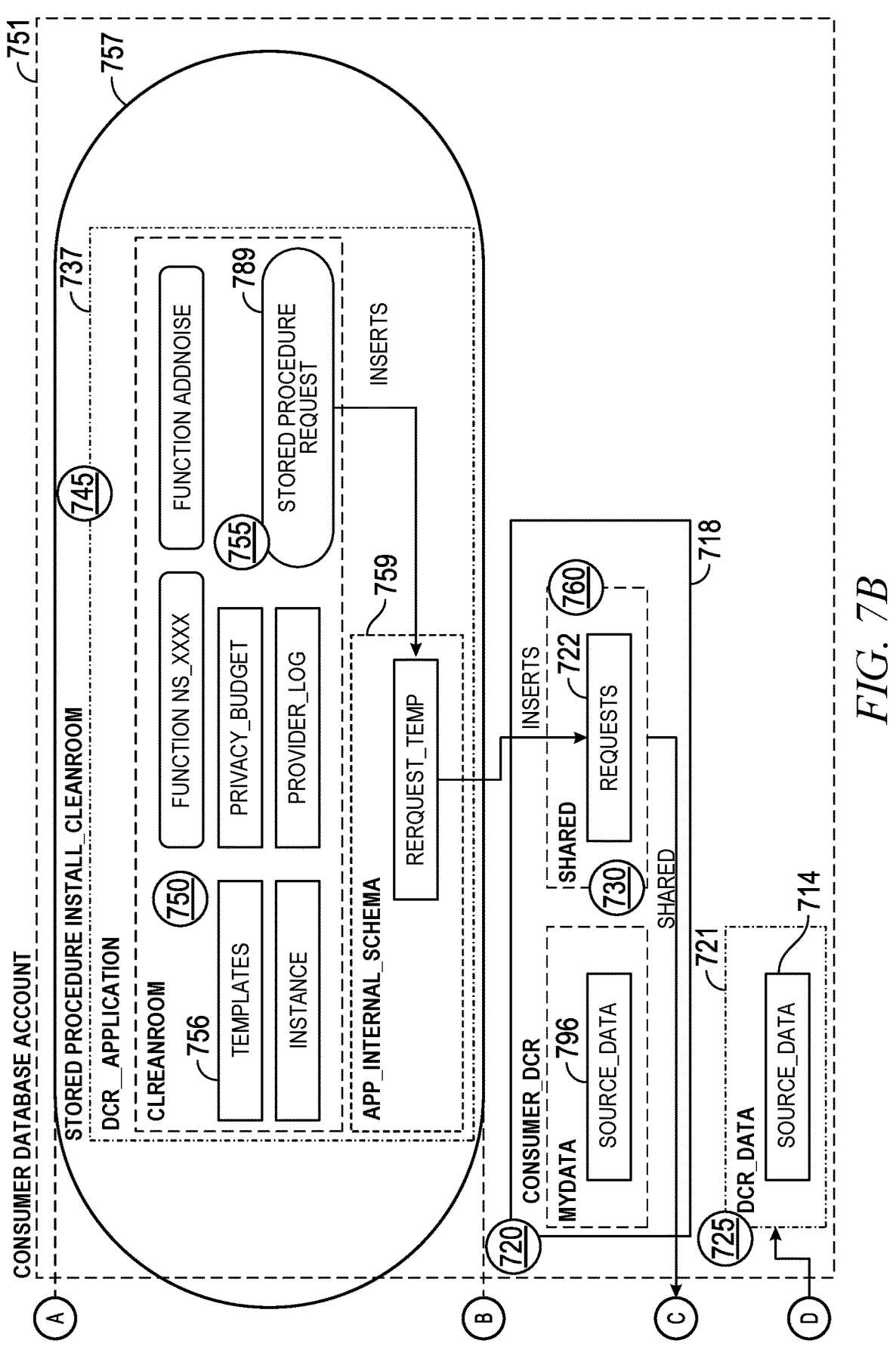

FIGS. 7A and 7B show example data architectures for implementing defined access clean rooms using native applications, in accordance with some example embodiments. In some example embodiments, a native application (e.g., local application) is configured so that a provider can create local state objects (e.g., tables) and local compute objects (e.g., stored procedures, external functions, tasks) and also share objects representing the application logic in the consumer account using the distributed database sharing objects and metadata. In some example embodiments, a native application is installed in the consumer accounts as a database instance that is shareable. For example, a provider can generate a native application that includes stored procedures that analyze and enrich data in a given consumer account. A consumer can install the provider's native application in the consumer's account as a database, and call stored procedures in the installed native application that provide the application functionality. In some example embodiments, the native application is configured to write only to a database in the consumer account. Further, in some example embodiments, a native application of a provider can be packaged with one or more other objects such as tables, views, and stored procedures of the provider account, which are then generated in the consumer account upon installation via an installer script. In some example embodiments, the native application installer script is configured to: (1) create local objects in the consumer account, and (2) control the visibility of objects in the native application with the different consumer accounts that may install the provider's native application.

FIG. 7A shows a provider database account 702 and FIG. 7B shows a consumer database account 751 where connections between FIGS. 7A and 7B are shown using capital letters with circles (e.g., A, B, C, and D). With reference to FIG. 7A, at operation 705, the provider database account 702 generates a defined access clean room 704 (DCR). At operation 710, the provider database account 702 shares a native application installer procedure 706 (e.g., installer clean room stored procedure) as a native database application with the consumer database account 751. At operation 715 in FIG. 7A, the provider database account 702 shares source data 708 as a source data database view 711 in a clean room 712 which is then accessible by the consumer database account 751 as source data 714 (in FIG. 7B). While the source data 714 is accessible as a share by the consumer database account 751, the source data 714 may be empty (e.g., empty table, empty database object, not yet populated) and is controlled by a data firewall 716, such as a row access policy of the provider database account 702, as discussed above. In FIG. 7B, at operation 720, the consumer database account 751 creates a clean room consumer database 718.

At operation 725, the consumer database account 751 creates the database store 721 to store the source data 714 shared from the provider database account 702. At operation 730, the consumer database account 751 shares a request table 722 with the provider database account 702 as a consumer-defined clean room shared request table 723 (in FIG. 7A). At operation 735, the provider database account 702 creates a consumer data store 724 (e.g., database, table) to store a requests table 723 received as a consumer share from the consumer database account 751. Further, the provider database account 702 creates a management object 737 comprising a stream object to track changes on the request table 723, and a task object in the management object 737 to execute the process requests stored procedure 743 when a new request is an input into the requests table 723 (e.g., a request from the consumer and user that is input into the request table 722 and that automatically shared as an entry in requests table 723). In FIG. 7B, at operation 745, the consumer database account 751 creates a database store 721 to reference the provider's shared source data 714 (in FIG. 7B), which initiates a stored procedure installer script that generates a runtime instance of the native application 757. In FIG. 7B, at operation 750, the execution and creation of the data clean room native application 757 using the native application installer procedure 706 to create a clean room schema, and all of the objects within the clean room as specified in the native application installer procedure 706, in accordance with some example embodiments. Further, the native application installer procedure 706 grants privileges on the tables and the request data stored procedure. Further, the native application installer procedure 706 creates application internal schema 759 for use in request processing.

At operation 755, the consumer database account 751 generates a clean room request by calling the request stored procedure 789 and passes in a query template name, selects groups by columns, filters, a privacy budget to implement, and any other parameters that are required for the query template chosen or otherwise passed in. In some example embodiments, differential privacy is implemented to share the aggregated dataset (e.g., joined dataset) while withholding information about individuals in the dataset (e.g., if the effect of making an arbitrary single substitution in the database is small enough, the query result cannot be used to infer much about any single individual, and therefore provides privacy).

At operation 760, consumer database account 751 implements the request stored procedure 789 which is configured to: (1) generate a query based on the query template and the parameters passed in, (2) signed the query request using encryption key created by the data clean room native application 757 to authenticate to the provider database account 702 that the data clean room native application 757 issued the request, (3) apply differential privacy noise parameter to the query results based on and epsilon value (also referred to as a "privacy budget") passed in with the query, and (4) as the query to the requests table 722 which is then automatically shared as an entry in the request table 723.

At operation 765 in FIG. 7A, the provider database account 702 implements a stream to capture the insert entry into the request table 723 subsequently triggers the task of the management object 737 to execute the process requests matches the provider key, (2) confirming that the request originated from a corresponding preauthorized consumer account (e.g., consumer database account 751), (3) confirming that the query uses a valid template from the templates 746 (e.g., from a plurality of valid and preconfigured templates, such as jinja SQL templates, that are generated or otherwise authorized by the provider account for use as the templates 746), (4) confirming that the instant ID of data clean room native application 757 the matches the expected instance ID, and (5) confirming that the provider database account 702 is the expected or preconfigured account. At operation 775, if the request is valid, the provider database account 702 updates the status is approved in a request log which configures the data firewall 716 (e.g., a row access policy) to provide access to rows based on the policy to a portion of the data in the source data 708, which is then shared to the consumer database account 751 as source data 714. In FIG. 7B, once the data is shared into the source data 714, the consumer database account 751 can execute the query within the data clean room native application 757 on the consumer database account 751 (e.g., by execution nodes of the consumer database account 751).

Figure 8:
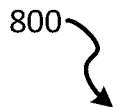
FIG. 8 shows a flow diagram of a method of implementing defined access clean rooms, according to some example embodiments.
Figure 8:
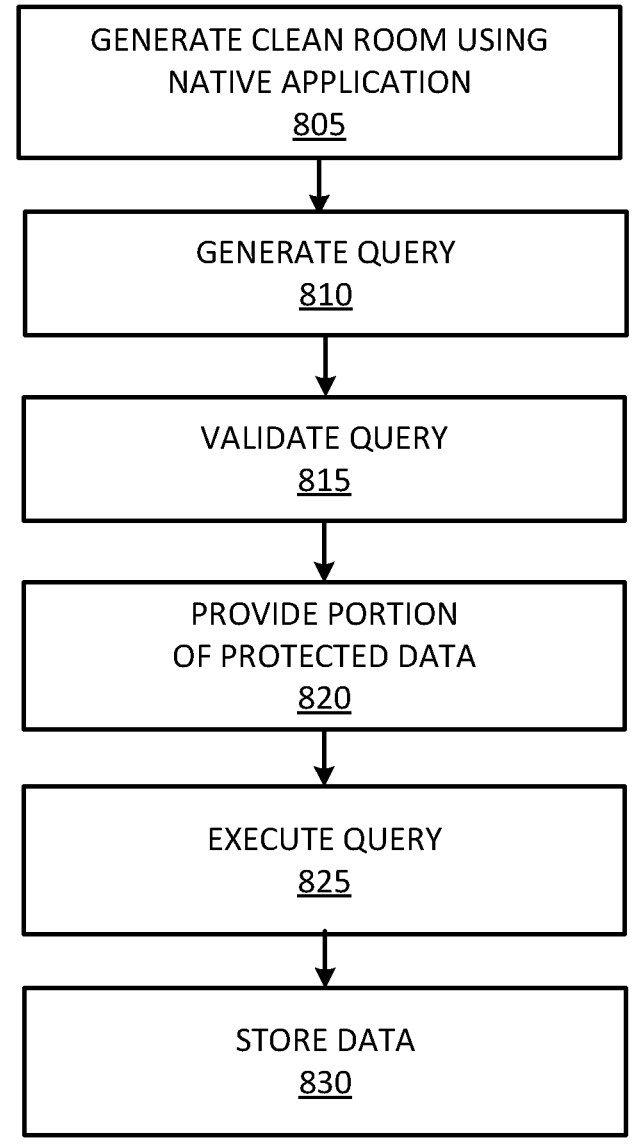

FIG. 8 shows a flow diagram of a method 800 for implementing data clean rooms using native applications, according to some example embodiments.

At operation 805, the data clean room system 230 generates a clean room as the data clean room native application 757.

At operation 810, the data clean room system 230 generates a clean room query using a template from the query templates 756 (e.g., one of the templates 746 provided by the provider database account 702) and using input values. For example, the provider database account 702 may provide a query template to the consumer as follows:

```
::::::::::::::::::CODE BEGIN:::::::::::::::::

select
{% if dimensions %}
    identifier({{ dimensions[0] }})
    {% for dim in dimensions[1:] %}
    , identifier({{ dim }})
    {% endfor %}
    , {% endif %}
    round(cleanroom.addNoise(count(distinct p.email),{{ epsilon | sqlsafe }},{{
app_instance | sqlsafe }}.cleanroom.ns_{{ request_id | sqlsafe }}( ))) as dp_overlap
from
    shared_schema.customers_v p,
    {{ consumer_db | sqlsafe }}.{{ consumer_shared_data_schema | sqlsafe }}.{{
consumer_customer_table | sqlsafe }} at(timestamp => '{{ at_timestamp | sqlsafe
}}'::timestamp_tz) c
where
    c.{{ consumer_join_field | sqlsafe }} = p.email
    {% if where_clause %}
    and ( {{ where_clause | sqlsafe }} )
    {% endif %}
{% if dimensions %}
    group by identifier({{ dimensions[0] }})
    {% for dim in dimensions[1:] %}
    , identifier({{ dim }})
    {% endfor %}
    {% endif %}
having dp_overlap > 25
order by dp_overlap desc;
::::::::::::::::::::::::::::::END:::::::::::::::::::::::::::::::
``` stored procedure 743. At operation 770, the process requests stored procedure 743 executes the query that validates the requests. In some example embodiments, the validation that is performed by the process requests stored procedure 743 comprises (1) determining that the encrypted request key The consumer database account 751 can receive the template and complete, fill-out, or edit the fields between the {{ }} braces (e.g., brace or tag-based term replacement to generate a correctly formatted resulting template for use, a jinja template). The data clean room system 230 receives the completed query template and then implements the request stored procedure 789 to render the query and output the below query code, which is the actual query code run against the shared data:

```
:::::::::::::::::CODE BEGIN:::::::::::::::

select
    identifier('p.status')
    , identifier('c.pets')
    , round(cleanroom.addNoise(count(distinct
p.email),0.1,dcr_mrm1_app.cleanroom.ns_afac_73e9f( ))) as dp_overlap
from
    shared_schema.customers_v p,
    dcr_mrml_consumer.shared.customers at(timestamp => '2022-05-17
11:50:17.347 -0700'::timestamp_tz) c
where
    c.email = p.email
    and ( PETS <> $$BIRD$$ )
    group by identifier('p.status')
    , identifier('c.pets')
having dp_overlap > 25
order by dp_overlap desc;
:::::::::::::::::::::::::::::::::END::::::::::::::::::::::::::::::
```

At operation 815, the data clean room system 230 validates the query. For example, data clean room system 230 validates the request received in the request table 723, as discussed above.

At operation 820, the data clean room system 230 extract a portion of the protected data (e.g., firewalled data) as the source data 714 of the provider with the consumer database account 751.

At operation 825, the data clean room system 230 executes the query. For example, one or more execution nodes (FIG. 3) managed by the consumer database account 751 implement the data clean room native application 757 to process the query by joining the customer source data 796 with the source data 714, which is by then populated by the data firewall 716 (e.g., row access policy that firewalls some data and allows other data at query processing time, upon the provider receiving a given query for processing) allowing defined access to some of the source data 708, as discussed above.

At operation 830, the data clean room system 230 stores the data processed by execution of the query at operation 825 (e.g., in one or more data storage devices on the storage platform 104 that are managed by the consumer database account 751). In some example embodiments, additional processing is performed on the data and then it is stored at operation 830.

Described implementations of the subject matter can include one or more features, alone or in combination as illustrated below by way of example.

Example 1. A method comprising: generating, using one or more processors of a machine, a shared database as an local application in a consumer database of a distributed database; generating a query from a query template shared with the consumer database by a provider database of the distributed database; validating fields of the query match the query template; providing a first portion of a provider protected dataset to the consumer database, the provider protected dataset protected by a data share policy managed by the provider database; executing the query on a shared dataset that comprises the first portion of the provider protected dataset joined with a second portion of data from the consumer database; storing results data.

Example 2. The method of example 1, wherein the local application comprises an installer script to install a plurality of database objects on a database account of the distributed account.

Example 3. The method of any of examples 1 or 2, wherein the provider database generates the local application and shares access with the consumer database to the local application to install the local application on the consumer database.

Example 4. The method of any of examples 1-3, further comprising: rejecting the one or more fields in response to determining that the one or more fields are not valid, and halting processing of the query.

Example 5. The method of any of examples 1-4, wherein generating the query comprises: replacing terms in the query template with terms input by the consumer database.

Example 6. The method of any of examples 1-5, wherein generating the results data comprises injecting noise into results data.

Example 7. The method of any of examples 1-6, wherein the noise data is injected according to differential privacy that implements a budget parameter that limits an amount of the noise injected.

Example 8. The method of any of examples 1-7, wherein the data share policy comprises a row access policy that limits row data of the provider database that is available to the query from the consumer database.

Example 9. The method of any of examples 1-8, wherein the row access policy is implemented at a query processing time when the query is received by the provider database.

Example 10. A computing system comprising: a processor; and a memory storing instructions that, when executed by the processor, execute operations comprising any of the methods of examples 1-9.

Example 11. A non-transitory computer-readable storage medium, the computer-readable storage medium including instructions that when executed by a computer, cause the computer to perform any of the operations of the examples 1-9.

Figure 9:
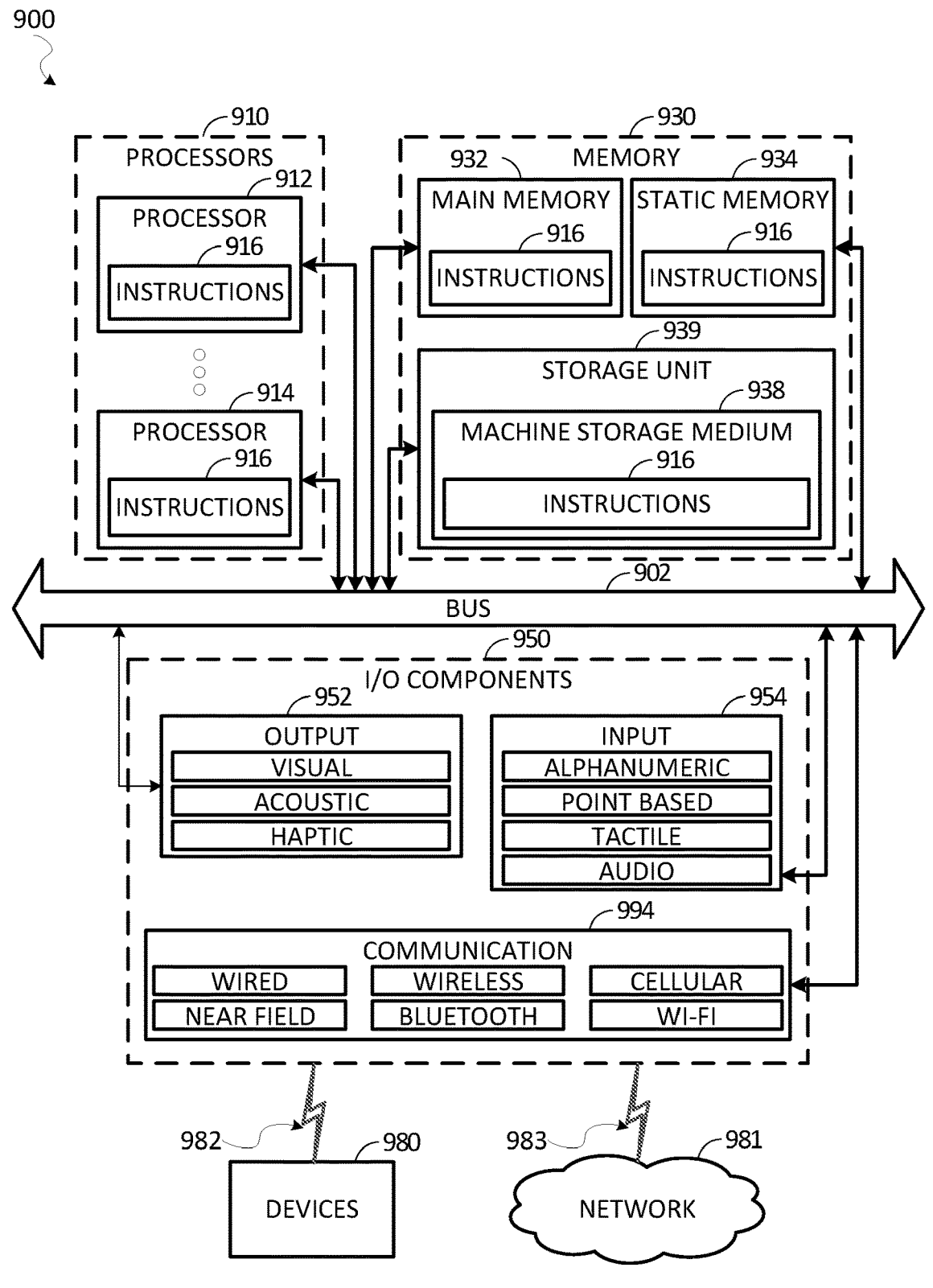
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code), for causing the machine 900 to perform any one or more of the methodologies discussed herein, may be executed. For example, the instructions 916 may cause machine 900 to execute any one or more operations of the method of FIG. 8 by one or more processors. described herein. As another example, the instructions 916 may cause the machine 900 to implement portions of the data flows described herein. In this way, the instructions 916 transform a general, non-programmed machine into a particular machine 900 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 939, all accessible to the processors 910 such as via the bus 902. The main memory 932, the static memory 934, and the storage unit 939 comprising a machine storage medium 938 may store the instructions 916 embodying any one or more of the methodologies or functions described herein. The instructions 916 may also reside, completely or partially, within the main memory 932, within the static memory 934, within the storage unit 939, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines, such as mobile phones, will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 994 operable to couple the machine 900 to a network 981 via a coupler 983 or to devices 980 via a coupling 982. For example, the communication components 994 may include a network interface component or another suitable device to interface with the network 981. In further examples, the communication components 964 may include wired communication components, wireless communication components, cellular communication components, and other communication components to provide communication via other modalities. The devices 980 may be another machine or any of a wide variety of peripheral devices (e.g., a peripheral device coupled via a universal serial bus (USB)). For example, as noted above, the machine 900 may correspond to any one of the client device 114, the compute service manager 108, the execution platform 110, and may include any other of these systems and devices.

The various memories (e.g., 930, 932, 934, and/or memory of the processor(s) 910 and/or the storage unit 939) may store one or more sets of instructions 916 and data structures (e.g., software), embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 981 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 981 or a portion of the network 981 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 981 using a transmission medium via a network interface device (e.g., a network interface component included in the communication components 994), and utilizing any one of a number of well-known transfer protocols (e.g., hypertext transfer protocol (HTTP)). Similarly, the instructions 916 may be transmitted or received using a transmission medium via the coupling 982 (e.g., a peer-to-peer coupling) to the devices 980. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method performed by executing instructions on at least one hardware processor, the method comprising:

causing enablement of a consumer database account to use a query template based on a received preapproval of the query template, the query template including one or more blanks or placeholders, the query template configured to enable values to be entered into the one or more blanks or the one or more placeholders and to be used to execute a query based on the entered values;

receiving a query generated by the consumer database account, the query including the query template with entered values into the one or more blanks or the one or more placeholders of the query template;

determining particular source provider data for responding to the query based on entered values in the query template;

assessing whether the particular source provider data for the query meets one or more data restrictions of visibility of a defined access clean room;

validating that the query is consistent with the query template based on the assessment that the particular source provider data meets the one or more data restrictions of visibility for the defined access clean room; and in response to validating that the query is consistent with the query template:

generating, based on validating that the query is consistent with the query template, query results by executing the query; and transmitting at least a portion of the query results to the consumer database account.

2. The method of claim 1, further comprising:

generating, at a provider database account, an installation file that, when processed, generates instances of the defined access clean room providing clean room functionality, defines parameters for the instances of the defined access clean room, generates one or more procedures for the instances of the defined access clean room, and controls visibility of objects across different consumer accounts;

providing the installation file to the consumer database account; and installing, in the consumer database account, the installation file to generate an application instance of the defined access clean room.

3. The method of claim 2, wherein both the provider database account and the consumer database account reside in a distributed database.

4. The method of claim 2, wherein:

the provider database account resides in a first networked database platform; and the consumer database account resides in a second networked database platform.

5. The method of claim 4, wherein the first networked database platform and the second networked database platform are in different geographic regions.

6. The method of claim 2, wherein the installing of the application instance in the consumer database account comprises executing an installer script that includes commands for installing one or more database objects in the consumer database account.

7. The method of claim 2, wherein the query is directed to a combination of source provider data shared by the provider database account and source consumer data shared by the consumer database account with the application instance.

8. The method of claim 7, wherein the query performs an overlap analysis of the shared source provider data and the shared source consumer data.

9. The method of claim 8, wherein the overlap analysis is with respect to a user- identifier column in both the shared source provider data and the shared source consumer data.

10. The method of claim 2, further comprising sharing, by the provider database account, source provider data within a defined access clean room, the sharing making the source provider data accessible to the consumer database account via the application instance.

11. The method of claim 1, further comprising:

sharing, by a provider database account, the query template with the consumer database account via an application instance; and receiving preapproval of the query template by the consumer database account.

12. The method of claim 10, further comprising assessing whether the query meets data restrictions of visibility to the source provider data that is shared with the defined access clean room.

13. The method of claim 1, further comprising:

receiving a second query generated by the consumer database account based on the query template;

determining that the second query is not consistent with the query template; and rejecting the second query based on determining that the second query is not consistent with the query template.

14. The method of claim 1, wherein generating the query results comprises injecting noise data into the query results to implement differential privacy, wherein an amount of the noise data injected is based on an epsilon value indicative of a privacy budget.

15. A computer system comprising:

at least one hardware processor; and one or more non-transitory computer readable storage media containing instructions that, when executed by the at least one hardware processor, cause the computer system to perform operations comprising:

causing enablement of a consumer database account to use a query template based on a received preapproval of the query template, the query template including one or more blanks or placeholders, the query template configured to enable values to be entered into the one or more blanks or the one or more placeholders and to be used to execute a query based on the entered values;

receiving a query generated by the consumer database account, the query including the query template with entered values into the one or more blanks or the one or more placeholders of the query template;

determining particular source provider data for responding to the query based on entered values in the query template;

assessing whether the particular source provider data for the query meets one or more data restrictions of visibility of a defined access clean room;

validating that the query is consistent with the query template based on the assessment that the particular source provider data meets the one or more data restrictions of visibility for the defined access clean room; and in response to validating that the query is consistent with the query template:

generating, based on validating that the query is consistent with the query template, query results by executing the query; and transmitting at least a portion of the query results to the consumer database account.

16. The computer system of claim 15, wherein the operations further comprise:

generating, at a provider database account, an installation file that, when processed, generates instances of the defined access clean room providing clean room functionality, defines parameters for the instances of the defined access clean room, generates one or more procedures for the instances of the defined access clean room, and controls visibility of objects across different consumer accounts;

providing the installation file to the consumer database account; and installing, in the consumer database account, the installation file to generate an application instance of the defined access clean room.

17. The computer system of claim 16, wherein both the provider database account and the consumer database account reside in a distributed database.

18. The computer system of claim 16, wherein:

the provider database account resides in a first networked database platform; and the consumer database account resides in a second networked database platform.

19. The computer system of claim 18, wherein the first networked database platform and the second networked database platform are in different geographic regions.

20. One or more non-transitory computer readable storage media containing instructions that, when executed by at least one hardware processor of a computer system, cause the computer system to perform operations comprising:

causing enablement of a consumer database account to use a query template based on a received preapproval of the query template, the query template including one or more blanks or placeholders, the query template configured to enable values to be entered into the one or more blanks or the one or more placeholders and to be used to execute a query based on the entered values;

receiving a query generated by the consumer database account, the query including the query template with entered values into the one or more blanks or the one or more placeholders of the query template;

determining particular source provider data for responding to the query based on entered values in the query template;

assessing whether the particular source provider data for the query meets one or more data restrictions of visibility of a defined access clean room;

validating that the query is consistent with the query template based on the assessment that the particular source provider data meets the one or more data restrictions of visibility for the defined access clean room; and in response to validating that the query is consistent with the query template:

generating, based on validating that the query is consistent with the query template, query results by executing the query; and transmitting at least a portion of the query results to the consumer database account.

\* \* \* \* \*